US008757068B2

(12) United States Patent
Schmidt

(10) Patent No.: US 8,757,068 B2
(45) Date of Patent: Jun. 24, 2014

(54) DEVICE FOR CONNECTING A TABLE TO THE SIDE WALL OF A VEHICLE

(75) Inventor: Gerhard Schmidt, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 128 days.

(21) Appl. No.: 13/386,561

(22) PCT Filed: Jun. 17, 2010

(86) PCT No.: PCT/EP2010/058507
§ 371 (c)(1),
(2), (4) Date: Feb. 14, 2012

(87) PCT Pub. No.: WO2011/009679
PCT Pub. Date: Jan. 27, 2011

(65) Prior Publication Data

US 2012/0132767 A1 May 31, 2012

(30) Foreign Application Priority Data

Jul. 23, 2009 (DE) ......................... 10 2009 034 511

(51) Int. Cl.
*A47C 23/00* (2006.01)

(52) U.S. Cl.
USPC ........................................ 108/44; 297/216.16

(58) Field of Classification Search
USPC ......... 108/44, 45, 48; 297/147, 216.16, 216.1
See application file for complete search history.

(56) References Cited

U.S. PATENT DOCUMENTS 1,896,971 A * 2/1933 Ravlin ............................ 108/46
3,446,469 A * 5/1969 Whitten ..................... 297/216.1
3,460,791 A * 8/1969 Judd ........................ 248/188.91
4,249,769 A * 2/1981 Barecki .................... 297/216.16
5,046,433 A 9/1991 Kramer et al.
5,662,376 A * 9/1997 Breuer et al. ............ 297/216.16
6,105,510 A * 8/2000 Skoff et al. ..................... 108/44
6,161,486 A * 12/2000 Boots .............................. 108/48
6,505,890 B2 * 1/2003 Riley et al. ............... 297/216.16
6,520,091 B1 2/2003 Dettmers
6,565,151 B2 * 5/2003 Jarnail et al. ............. 297/216.16
7,360,832 B2 * 4/2008 Yokota et al. ............ 297/216.16

(Continued)

FOREIGN PATENT DOCUMENTS

DE 86 00 534 U1 2/1986
DE 8600534 U1 2/1986

(Continued)

*Primary Examiner* — Jose V Chen
(74) *Attorney, Agent, or Firm* — Laurence A. Greenberg; Werner H. Stemer; Ralph E. Locher

(57) ABSTRACT

A device connects a table for groups of seats arranged transversely with respect to the direction of travel to the side wall of a vehicle with an upright supporting structure disposed below the table top in the vicinity of the side wall and the lower end is fastened to the side wall and the upper end is fastened to the table top. The supporting structure for the table top is stable and reduces the risk of injury to passengers during collisions without any loss in comfort. The supporting structure has two flexurally rigid posts arranged upright at a distance from each other in the longitudinal direction and have buckling points spaced apart from one another in the longitudinal direction of the posts and have defined buckling axes which, when a force acting on the table is exceeded, permit an elastic yielding of the table in the direction of the force.

9 Claims, 2 Drawing Sheets

A
12
8
1
A
4
5
S
8
3
5
2
12

(56) References Cited

U.S. PATENT DOCUMENTS

| | | | | |
|---|---|---|---|---|
| 7,810,881 | B2 * | 10/2010 | Beneker et al. | 297/216.1 |
| 7,862,114 | B2 * | 1/2011 | Kalina et al. | 297/216.1 |
| 8,240,758 | B2 * | 8/2012 | Combest | 297/216.16 |
| 2001/0003962 | A1 * | 6/2001 | Park et al. | 108/44 |
| 2002/0145315 | A1 * | 10/2002 | Fraley et al. | 297/216.16 |
| 2005/0168019 | A1 * | 8/2005 | Frey | 297/216.16 |
| 2006/0214482 | A1 * | 9/2006 | Williamson et al. | 297/216.16 |
| 2009/0249982 | A1 * | 10/2009 | Palethorpe | 108/44 |
| 2009/0267390 | A1 * | 10/2009 | Honnorat et al. | 297/216.16 |
| 2010/0102170 | A1 * | 4/2010 | LaConte | 297/216.16 |

FOREIGN PATENT DOCUMENTS

| | | | |
|---|---|---|---|
| DE | 36 24 156 | C1 | 11/1987 |
| DE | 295 03 473 | U1 | 7/1996 |
| DE | 29503473 | U1 | 7/1996 |
| DE | 201 04 240 | U1 | 7/2001 |
| DE | 20104240 | U1 | 7/2001 |
| DE | 100 08 566 | A1 | 8/2001 |
| DE | 60005192 | T2 | 6/2004 |
| EP | 1 195 307 | A1 | 4/2002 |
| EP | 1 296 147 | A1 | 3/2003 |
| EP | 1293147 | A1 | 3/2003 |
| FR | 2 802 070 | A1 | 6/2001 |

* cited by examiner

S
1
5
12
12
5
6
7
7
4
4
5
12
12
5
2

1
12
5
11
S
4
3
5
2
12

DEVICE FOR CONNECTING A TABLE TO THE SIDE WALL OF A VEHICLE

BACKGROUND OF THE INVENTION

Field of the Invention

The invention relates to a device for connecting a table for groups of seats arranged transversely with respect to the direction of travel to the side wall of a vehicle, in particular a rail vehicle, with an upright supporting structure which is arranged in the vicinity of the side wall below the table top and the lower end of which is fastened to the side wall and the upper end of which is fastened to the table top.

Groups of seats comprising seats arranged opposite each other and transversely with respect to the direct of travel in rail vehicles are often equipped with tables fixedly installed between said groups of seats. These tables must withstand the loadings experienced during operation as well as defined extraordinary loads (e.g. vandalism) without incurring any damage.

In the event of vehicles colliding with obstacles and the high longitudinal decelerations resulting therefrom considerably greater loads occur as a result of passengers impacting on the table edge. In this event, the fastening of the table in the vehicle is supposed to limit the movement of the table to such an extent that the survival space of the passengers sitting opposite, i.e. with their backs to the direction of travel, is not impaired. On the other hand, a controlled resilience of the table edge is advantageous for limiting the impact forces to avoid or reduce injuries.

A substantial transmission of longitudinal forces from the table top via a leg into the floor seems disadvantageous due to the large offset moments and the limited installation space for the leg. In addition, it is frequently required for cleaning purposes to be able to pivot the table including the leg upwards about an axis of rotation which is in the vicinity of the side wall, whereby the leg can only transmit pressure forces in the vertical direction.

The lever arm which is large in the transverse direction with respect to the point of impact of the passengers, in particular in the case of seating arrangements having two or more seats, is problematic when it comes to connecting a table to the side wall. This lever arm exerts a loading on a side wall connection predominantly as a result of a moment of force about the vertical axis. Accordingly, in the case of a plastic overloading in the event of a collision, a movement in the direction of this loading is to be expected, i.e. a rotation of the table top about a vertical axis in the vicinity of the side wall.

A disadvantage of this form of movement is that it creates a greatly varying impact force dependent upon the seating position of the passengers and thus upon the transverse spacing of their point of impact from the axis of rotation. Thus, for example in an arrangement with two seats adjacent to each other, the middle of the seat next to the aisle is approximately three times the distance from the side wall as the seat on the window side. Accordingly, a three-times greater deformation force on the table edge is to be expected for the passenger sitting by the window, which renders it virtually impossible to achieve a purposeful design for reducing the risk of injury for all seat positions.

In order to avoid this conflict of design, there is the option of providing energy absorbing elements, which limit the force, directly at the point of impact on the table edge in front of the respective seat position. This can be achieved by the material of the table edge itself being able to deform or by displacement mechanisms disposed in or below the table top which enable the table to be displaced in the direction of travel. However, in order also to be able to absorb the vertical operating and extraordinary loads, a large amount of clear installation height is required for such solutions, which limits the available space below the table and thus the comfort of the passengers.

In the construction of modern vehicles for reasons of standardization and flexibility mounting rails which extend continuously in the longitudinal direction, e.g. in the form of C-rails, are widely used for fastening interior fittings, primarily seats. In order to limit the number of mounting rails and the associated necessary cut-outs in the side wall cladding, in some designs the side wall connection of the seats is also used for fastening the table. Since the conventional C-rail is positioned at the height level of the sub-frames of the seats, i.e. clearly below the table top, a post which is directly adjacent to the side wall is used for connection purposes in known solutions. However, the problem associated with a direct side wall connection as described above still remains.

BRIEF SUMMARY OF THE INVENTION

The object of the present invention is, based on the problems and disadvantages of the known table fastening, to produce a support structure for the side wall connection of a table in front of a group of seats arranged transversely to the direction of travel, which structure with a high level of stability clearly reduces the risk of injury to the passengers during operation, in particular during collisions, without impairing the comfort.

This object is achieved in accordance with the invention in that the support structure comprises at least two substantially flexurally rigid posts which are arranged upright at a distance from each other in the longitudinal direction of the vehicle and are provided with predetermined buckling points which are spaced apart from one another in the longitudinal direction of the posts and have defined buckling axes which, when a defined force acting on the table in the longitudinal direction of the vehicle is exceeded, permit a preferably elastic or plastic yielding of the table in the direction of said force. The term 'predetermined buckling points' is understood to refer to both proper and pseudo joints which permit the posts to bend out of their extended alignment. In accordance with the invention the predetermined buckling points are preferably each provided in the region of both ends of the posts adjacent to the table top and to the side wall connection.

In the event of a collision, in other words if, for example, a passenger is thrown against the table edge, the construction of the support structure in accordance with the invention with correspondingly designed posts causes the table top to move on a circular path which is determined by the design of the posts in the longitudinal direction of the vehicle and can be used for the desired deformation path in the event of a collision. The post is articulated respectively in its correspondingly designed end regions to the same extent as the predetermined buckling points. In each case, it allows the table to move backwards purposefully in the direction fixed by the buckling axis of the predetermined buckling point. The invention can be used very easily in the method of constructing vehicles, where the connection site for fastening the posts to the side wall is fundamentally below the table top, preferably at the site where the seat is fastened to the C-rail.

A similar deformation would in fact be expected in the case of a plastic overloading of a known vertical post for fastening a table which is fastened in the lower region of the side wall where the loading is purely longitudinal. Since however, as described above, the loads caused by the passengers impacting on the table edge occur under a large lever arm, the posts would be loaded predominantly by a moment about their vertical axis. This moment in the form of a pair of forces can be absorbed in the transverse direction of the vehicle by arranging in accordance with the invention the two posts in a large as possible spacing in the longitudinal direction.

In accordance with the invention the predetermined buckling points form in each case a type of joint whose buckling axes lie substantially transverse to the direction of travel, wherein the post regions which are adjacent in the direction towards the side wall connection and towards table top are mutually connected in each case in a torsion-rigid manner about the longitudinal axis of the vehicle to prevent the posts rotating with respect to each other about the longitudinal axis of the vehicle. The posts can be connected to each other by means of the side wall connection (C-rail) and/or the table top itself. In a typical arrangement of a table in a group of seats opposite each other the lever arm of the longitudinal loads is considerable larger than half the spacing of the posts so that these are predominantly loaded in the transverse direction of the vehicle. In order nevertheless to force the desired longitudinal movement of the posts as opposed to the transverse movement the design in accordance with the invention of quasi articulated regions with a bending resistance which is greatly dependent on the direction has proved itself.

According to a further feature of the invention, it is proposed that the posts are connected by means of at least one additional bracing element which is torsionally rigid in the longitudinal direction of the vehicle and extends parallel to the table top, the connection regions of the said bracing element being formed on the posts in each case likewise in the manner of a joint, wherein the joint axes thus formed extend in parallel with the buckling axes defined by the predetermined buckling points. This design is used in the event that due to the materials used and the installation spaces it is not possible to design the flexible cross-section in a manner to suit the loading. It is thus possible to increase further the number of regions which prevent the posts from rotating with respect to each other, irrespective of the predetermined buckling points which lie at the ends of the posts. The design of the elements which serve as bracing elements follows the same principles as that of the articulated regions at the ends of the posts.

In principle, the predetermined buckling points can be achieved by proper joints with a rotational axis aligned approximately in the transverse direction of the vehicle. The buckling axis of the predetermined buckling point and the axis of rotation of the joint are synonymous in this case. In view of the relatively large loads which occur, proper joints for absorbing and nullifying the impact energy would appear to be too costly for this application. Therefore it is proposed in accordance with the invention to design at least individual, preferably all, predetermined buckling points as elastic or plastic joints.

The horizontal cross-section of each post is preferably designed in the region of the predetermined buckling points such that the resisting torque about the buckling axis is considerably smaller than the resisting torque about the vertical axis. This can be achieved in an especially favorable manner if the horizontal cross-section through the post comprises in the region of the predetermined buckling point in the direction of the buckling axis a flat rectangular shape with a central cut-out about the vertical axis. When converting this into practice, this can be achieved using a metal section which is slotted in the region of the joint.

In order to provide effective protection of the passengers with varying occupancy of the seats it is desirable to decouple from each other the deforming characteristics of the possible impact points on the table edge. This can be achieved approximately if according to another feature of the invention the buckling axes of the predetermined buckling points of the posts are rotated against the transverse direction of the vehicle such that they intersect precisely or approximately on a vertical axis which in the transverse direction with respect to the side wall lies closer to the vehicle middle than a passenger seat adjacent to the side wall. This inclined position of the buckling axes with respect to the transverse direction of the vehicle causes the table top to rotate about this vertical axis when the posts are rotated about the buckling or joint axis as a result of a force acting on the table edge. The point of impact of the passenger sitting on the aisle side thus does not experience a longitudinal movement and is therefore decoupled from the movement about the buckling axes. In order for this point of impact to deform it is necessary for the articulated regions or other inherent flexibilities to flex.

Since the vertical axis (the ideal axis of rotation) is a distance away from the point of impact of the passenger sitting on the side wall side, any force acting on this site can cause the predetermined buckling point to flex about the buckling axes, whereas the loading about the vertical axes is low due to the short lever arm.

In the event, for example for cleaning purposes, that the option of pivoting the table top upwards is desired, in one embodiment of the invention the posts can be subdivided by joints (11) which move in parallel with the longitudinal axis of the vehicle.

The invention thus achieves its object by virtue of a side wall connection of the table top having a deforming characteristic which is greatly dependent upon the direction. The risk of injury to the passengers is clearly reduced in comparison to earlier solutions, wherein the particularly advantageous connection of the table to the connection site of the vehicle seats can be retained.

An exemplified embodiment of the invention is illustrated in the drawing and described herein under. The drawings show:

DESCRIPTION OF THE INVENTION

Figure 1:
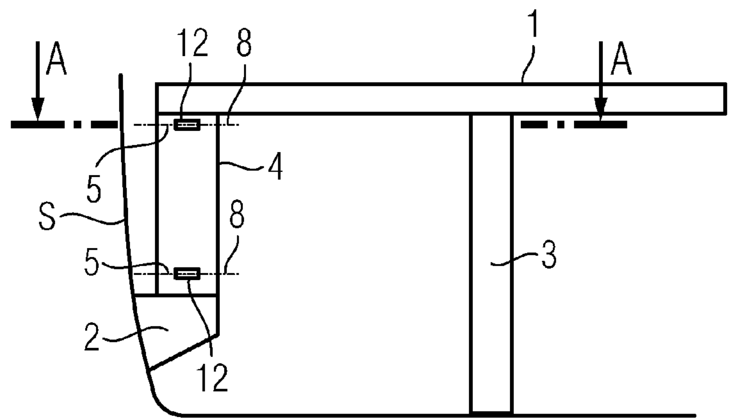
FIG. 1 a longitudinal sectional view through a vehicle table with a side wall connection in the region of the posts, FIG. 2 a schematic drawing of the deformation of the supporting structure the posts, FIG. 3 a horizontal sectional view A-A from FIG. 1 through the posts, FIG. 4 an element for the additional bracing of the posts, FIG. 5 the arrangement of a pivot joint for raising the table.

In FIG. 1 the table top which is designated with the numeral 1 is fastened to the side wall S of a rail vehicle between two opposite lying rows of seats (not illustrated). The illustration of the side wall connection site designated by the numeral 2 is only symbolic; the two upright, substantially flexurally rigid posts 4 are fastened here at their lower ends; their upper ends are fixedly connected to the table top 1. An upright table leg 3 is provided at a spaced disposition from the side wall S in the direction of the vehicle middle (towards the right in the drawing), the said table leg 3 is fastened at the upper end to the lower side of the table top 1 and stands freely on the floor.

Only one of the two posts 4 is evident in FIG. 1, since the second post 4 is located in the longitudinal direction of the vehicle (perpendicular to the plane of the drawing) behind the first post 4 at an only insignificantly smaller distance than the width of the table top 1. The second post 4 is also rigidly connected on the one hand at the end side to the side wall connection site 2 and on the other hand to the underside of the table top 1. Both posts 4 each comprise in their end regions, which are adjacent to the table top 1 or the connection site 2 of the side wall S, sections in which the resisting torque or the flexural resistance of the posts 4 transversely to their longitudinal axis and in the longitudinal direction of the vehicle is reduced to such an extent that predetermined buckling points 5 are formed at these sites in the manner of a pseudo joint. The posts 4 can quasi "bend down" at these points around joint axes or buckling axes 8. Each post 4 comprises two of these joint axes 8, namely in the vicinity of the top of the table and in the vicinity of the connection site 2 with respect to the sidewall S respectively. The regions of the posts 4 which lie above and below the buckling axes 8 respectively are connected to the table top or the connection site of the side wall in a torsion-rigid manner.

Figure 2:
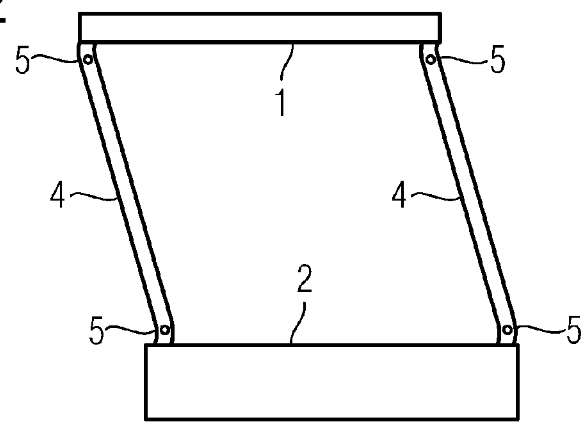

If the posts 4 are aligned in parallel with each other and the buckling axes of the two posts extend substantially in parallel with each other and transversely with respect to the longitudinal axis of the vehicle, the force exerted on the table edge causes the four-bar linkage which is formed from the connection sites 2 with respect to the side wall, table 1 and posts 4 to displace to form a parallelogram, as is illustrated schematically in FIG. 2. In so doing, the table top moves on a circular path in the direction of the longitudinal axis of the vehicle and yields under the forces which are exerted on the edge of the table 1.

Figure 3:
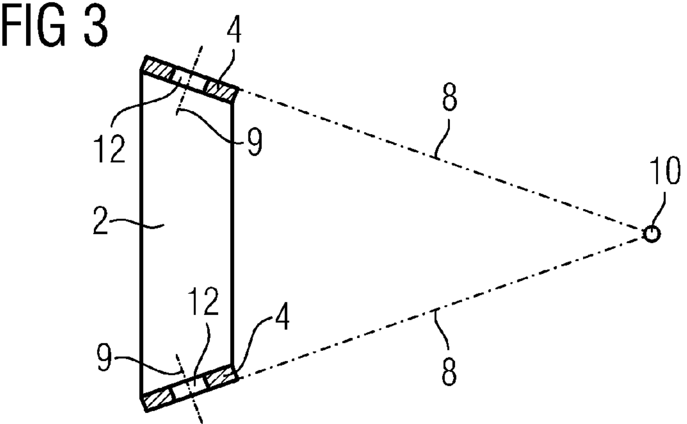

The predetermined buckling point 5 of the posts 4 can be formed by virtue of the fact that the cross-section of the post 4, as illustrated schematically in FIG. 3 with the designation 12, comprises a cut-out which reduces the remaining post cross-section and as a consequence reduces the resisting torque in this area. The displacement at this location in the predetermined buckling point about the buckling axis can be elastic or plastic depending upon the chosen material and the size of the forces being exerted.

It is evident in FIG. 3, which shows a sectional view along the intersection A-A in FIG. 1, that in the exemplified embodiment the posts 4 are slightly inclined, so that the extended buckling axes 8 intersect the floor and the table at a point on an imaginary upright 10. As the posts 4 rotate about the buckling axes 8 in the region of the predetermined buckling points 5, the table 1 and its top consequently simultaneously rotate about the upright 10. The point of impact of the passenger sitting on the aisle side (on the right in the drawing) does not experience any longitudinal movement in the longitudinal direction of the vehicle; the point of impact is decoupled from the movement about the buckling axis.

In order for the impact point of the passenger sitting on the aisle side to deform, it is necessary for the predetermined buckling points 5 to flex about the vertical axis 9 or for other yielding movements to occur. Since the ideal axis of rotation (upright 10) is a distance away from the point of impact of the passenger sitting on the wall side, any force exerted on this site can cause the predetermined buckling sites 5 to flex about the buckling axis 8, whereas the loading about the vertical axis 9 is low due to the short lever arm.

Figure 4:
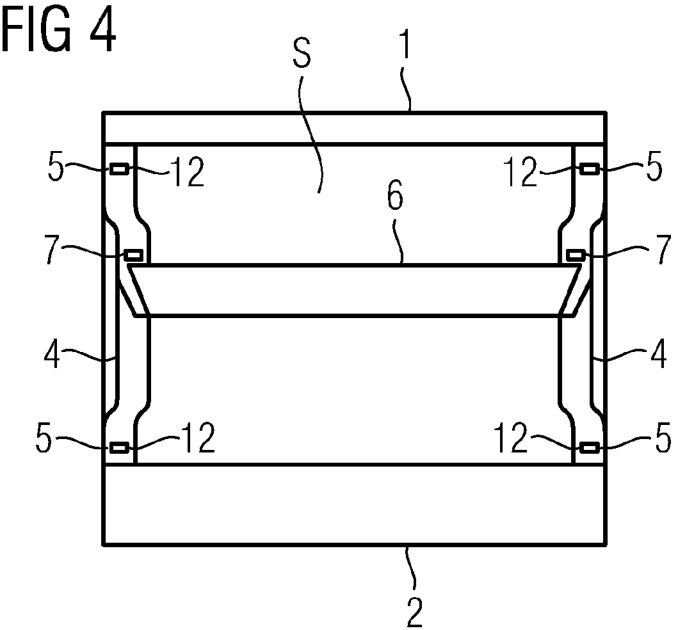

FIG. 4 illustrates a view of the table 1 as seen in the direction towards the side wall S; the posts 4 which stand upright and are fastened at a mutually spaced disposition to the table 1 and the connection site 2 of the side wall S are evident; also evident are the predetermined buckling points 5 created by cut-outs in the material in the posts 4, into which the supporting structure can deform like a parallelogram. Also evident is a bracing element 6 which serves to stabilize the system and which for its part is connected at both ends—quasi in an articulated manner—at 7 to the posts 4. The joint regions 7 of the bracing element 6 are designed according to the same principles as those of the predetermined buckling points 5 in the end regions of the posts 4.

Figure 5:
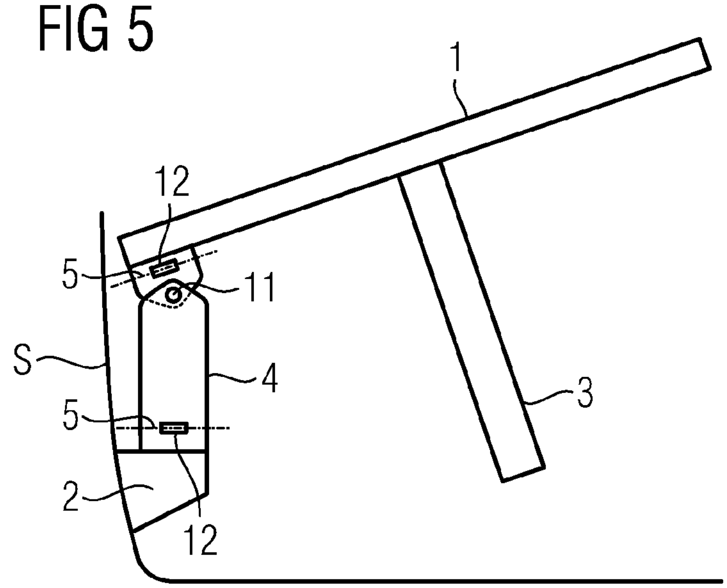

FIG. 5 shows once more the table 1 as seen in the direction of view in FIG. 1 but in this case in a position where it is pivoted upwards for cleaning purposes and where the table leg 3 is raised from the floor. In order to allow the upwards pivot movement, a proper joint 11 is provided in the posts, the axis of which extends in parallel with the longitudinal axis of the vehicle and as a consequence enables the table to be pivoted.

What is claimed is:

1. A device for connecting a table for groups of seats disposed transversely with respect to a direction of travel to a side wall of a vehicle, including a rail vehicle, the device comprising:

an upright supporting structure disposed in a vicinity of the side wall below a table top and having a lower end fastened to the side wall and an upper end fastened to the table top, said upright supporting structure containing at least two substantially flexurally rigid posts disposed upright at a mutually spaced disposition in a longitudinal direction of the vehicle and having predetermined buckling points spaced apart from one another in the longitudinal direction of said flexurally rigid posts and having defined buckling axes which, when a defined force acting on the table top in the longitudinal direction of the vehicle is exceeded, permit an elastic or plastic yielding of the table in a direction of the defined force, said predetermined buckling points each being formed in a manner of a joint and said buckling axes thereof lying substantially transverse to the direction of travel, and adjacent post regions of said flexurally rigid posts in the direction of the side wall and the table top being mutually connected in each case in a torsion-rigid manner about the longitudinal axis of the vehicle.

2. The device according to claim 1, wherein said predetermined buckling points are provided respectively in regions of both said lower and upper ends of said flexurally rigid posts adjacent to the table top and to a side wall connection site.

3. The device according to claim 1, wherein said flexurally rigid posts have connection regions; and further comprising a bracing element, said flexurally rigid posts are connected by said bracing element being torsionally rigid in the longitudinal direction of the vehicle and extending parallel to the table top, said connection regions connecting to said bracing element and formed on said flexurally rigid posts in each case likewise in a manner of a joint, said joint having a joint axis extending in parallel with said buckling axes defined by said predetermined buckling points.

4. The device according to claim 1, wherein at least one of said predetermined buckling points is formed as one of a pseudo elastic joint or a plastic joint.

5. The device according to claim 1, wherein a horizontal cross-section of each of said flexurally rigid posts is formed in a region of said predetermined buckling points in such a manner that a resisting torque about said buckling axis is substantially smaller than a resisting torque about a vertical axis.

6. The device according to claim 5, wherein said horizontal cross-section through said flexurally rigid posts in said region of said predetermined buckling point contains in a direction of said buckling axis a flat, rectangular shape with a central cut-out formed therein about the vertical axis.

7. The device according to claim 1, wherein said buckling axes of said predetermined buckling points of said flexurally rigid posts are rotated opposite to a vehicle transverse direction, such that they intersect precisely or approximately on a vertical axis which in the transverse direction with respect to the side wall lies closer to a vehicle middle than a passenger seat which is adjacent to the side wall.

8. The device according to claim 1, wherein said flexurally rigid posts are subdivided by joints which move in parallel with a vehicle longitudinal axis.

9. The device according to claim 1, wherein said buckling points are formed as one of pseudo elastic joints or plastic joints.

* * * * *